US009502760B2

(12) United States Patent
Fujita et al.

(10) Patent No.: US 9,502,760 B2
(45) Date of Patent: Nov. 22, 2016

(54) RADAR APPARATUS PROVIDED WITH RADOME

(71) Applicant: DENSO CORPORATION, Kariya, Aichi-pref. (JP)

(72) Inventors: Akihisa Fujita, Anjo (JP); Koichi Hoshino, Obu (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 38 days.

(21) Appl. No.: 14/407,809

(22) PCT Filed: Jun. 6, 2013

(86) PCT No.: PCT/JP2013/065710
§ 371 (c)(1),
(2) Date: Dec. 12, 2014

(87) PCT Pub. No.: WO2013/187309
PCT Pub. Date: Dec. 19, 2013

(65) Prior Publication Data
US 2015/0123872 A1 May 7, 2015

(30) Foreign Application Priority Data
Jun. 14, 2012 (JP) .................................. 2012-134679

(51) Int. Cl.
*H01Q 1/42* (2006.01)
*G01S 7/03* (2006.01)
(Continued)

(52) U.S. Cl.
CPC ................ *H01Q 1/422* (2013.01); *G01S 7/03* (2013.01); *G01S 13/931* (2013.01); *H01Q 1/42* (2013.01); *H01Q 9/0407* (2013.01); *G01S 2007/027* (2013.01); *H01Q 17/00* (2013.01)

(58) Field of Classification Search
CPC ........ H01Q 1/42; H01Q 1/422; H01Q 17/00; H01Q 9/0407
USPC .......................................................... 343/872
See application file for complete search history.

(56) References Cited

U.S. PATENT DOCUMENTS

2004/0036645 A1* 2/2004 Fujieda ..................... G01S 7/03
342/70
2004/0227663 A1* 11/2004 Suzuki ...................... G01S 7/03
342/70
2007/0210979 A1 9/2007 Shingyoji

FOREIGN PATENT DOCUMENTS

JP 2001127523 A 5/2001
JP 2003243920 A 8/2003
(Continued)

OTHER PUBLICATIONS

International Search Report (in Japanese with English Translation) for PCT/JP2013/065710, mailed Jul. 2, 2013; ISA/JP.
(Continued)

*Primary Examiner* — Dieu H Duong
(74) *Attorney, Agent, or Firm* — Harness, Dickey & Pierce, P.L.C.

(57) ABSTRACT

An antenna section is housed in a housing space which is defined by a radome and a housing, and provided with a transmitting antenna that transmits radar waves composed of radio waves of a predetermined frequency and a receiving antenna that receives the radar waves. The radome has a transmission section that is a portion transmitting the radar waves and an attenuation section that is a portion attenuating the radar waves. The attenuation section includes a first attenuation layer formed of a material for attenuating the radar waves. The first attenuation layer has a thickness that is 2n−1 times (n is a natural number) of one-quarter of a wavelength of the radar waves in the first attenuation layer.

4 Claims, 5 Drawing Sheets

(51) Int. Cl.
  *G01S 13/93* (2006.01)
  *H01Q 9/04* (2006.01)
  *H01Q 17/00* (2006.01)
  *G01S 7/02* (2006.01)

(56) References Cited

FOREIGN PATENT DOCUMENTS

| JP | 2004077399 A | 3/2004 |
| JP | 2007057483 A | 3/2007 |
| JP | 2007240358 A | 9/2007 |

OTHER PUBLICATIONS

International Preliminary Report on Patentability (in Japanese with English Translation) for PCT/JP2013/065710, issued Dec. 16, 2014; ISA/JP.

Japanese Office Action dated Oct. 27, 2015 in corresponding Japanese Application No. 2012-134679 with English translation.

* cited by examiner

RADAR APPARATUS PROVIDED WITH RADOME

CROSS REFERENCE TO RELATED APPLICATIONS

This application is a U.S. National Phase application under 35 U.S.C. 371 of International Application No. PCT/JP2013/065710 filed on Jun. 6, 2013 and published in Japanese as WO 2013/187309 A1 on Dec. 19, 2013. This application is based on and claims the benefit of priority from Japanese Patent Application No. 2012-134679 filed Jun. 14, 2012. The entire disclosures of all of the above applications are incorporated herein by reference.

BACKGROUND OF THE INVENTION

1. Technical Field

The present disclosure relates to a radar apparatus provided with an antenna and a radome that protects the antenna.

2. Background Art

A radar apparatus transmits a radio wave and receives a reflected wave of the transmitted radio wave to detect, for example, a distance to or a direction of an obstacle that is present in the surroundings. The radar apparatus is provided with an antenna which is protected by a radome.

For example, a patent literature JP-A-2003-243920 discloses a radar apparatus which is provided with an attenuation radome section as such a radome. The attenuation radome section has a core layer which is formed of a material that causes a high loss to the radio waves transmitted/received by the antenna.

Patent Literature 1 JP-A-2003-243920

However, in a portion to which the attenuation radome section is mounted, the ratio of shielding of the radio waves increases in proportion to the thickness of the core layer. Therefore, in order to attain a sufficient shielding effect, the core layer is required to be formed with a large thickness. However, there is a concern that such a large thickness hinders reduction of the size and the weight of the radar apparatus.

SUMMARY

Hence, it is desired to provide a radar apparatus which is able to efficiently shield radio waves.

A radar apparatus of the present disclosure includes a radome and an antenna. The radome has a transmission section and an attenuation section. The attenuation section at least includes a first attenuation layer formed of a material that attenuates radar waves. The first attenuation layer has a thickness that is (2n−1) times (n is a natural number) of one-quarter of a wavelength of a radar wave in the first attenuation layer.

In the radar apparatus of the present disclosure configured as described above, radar waves transmitted from the antenna via the radome include a transmission wave that is transmitted straight through the first attenuation layer for transmission outside, and a transmission wave that is reflected in a multiple manner in the first attenuation layer and then transmitted through the first attenuation layer for transmission outside. In the attenuation section, there is a difference between the paths of these transmission waves, and the difference corresponds to an integral multiple of one-half the wavelength of a radar wave in the first attenuation layer, creating a deviation in phase by one-half of the wavelength. Accordingly, both of the transmission waves act so as to cancel each other, thereby attenuating the radar waves transmitted through the attenuation section.

When a radar wave is received, similar cancellation action occurs between a reception wave that is transmitted straight through the first attenuation layer and a reception wave that is reflected in a multiple manner in the first attenuation layer and then transmitted through the first attenuation layer.

Advantageous Effects of the Invention

Thus, in the configuration of the radar apparatus of the present disclosure, it is not only that a radar wave is attenuated by the quality of a material configuring the attenuation section, but also that mutual cancellation action is permitted to occur between a simple transmission wave that is simply transmitted through the attenuation section, and a multiple reflection wave that is transmitted through the attenuation section after causing multiple reflections in the attenuation section. Accordingly, radio waves can be efficiently shielded.

DETAILED DESCRIPTION OF THE PREFERRED EMBODIMENTS

With reference to the drawings, hereinafter are described embodiments of the present disclosure.

The present disclosure is applied to a radar apparatus mounted to a vehicle.

First Embodiment

Configuration

Figure 1:
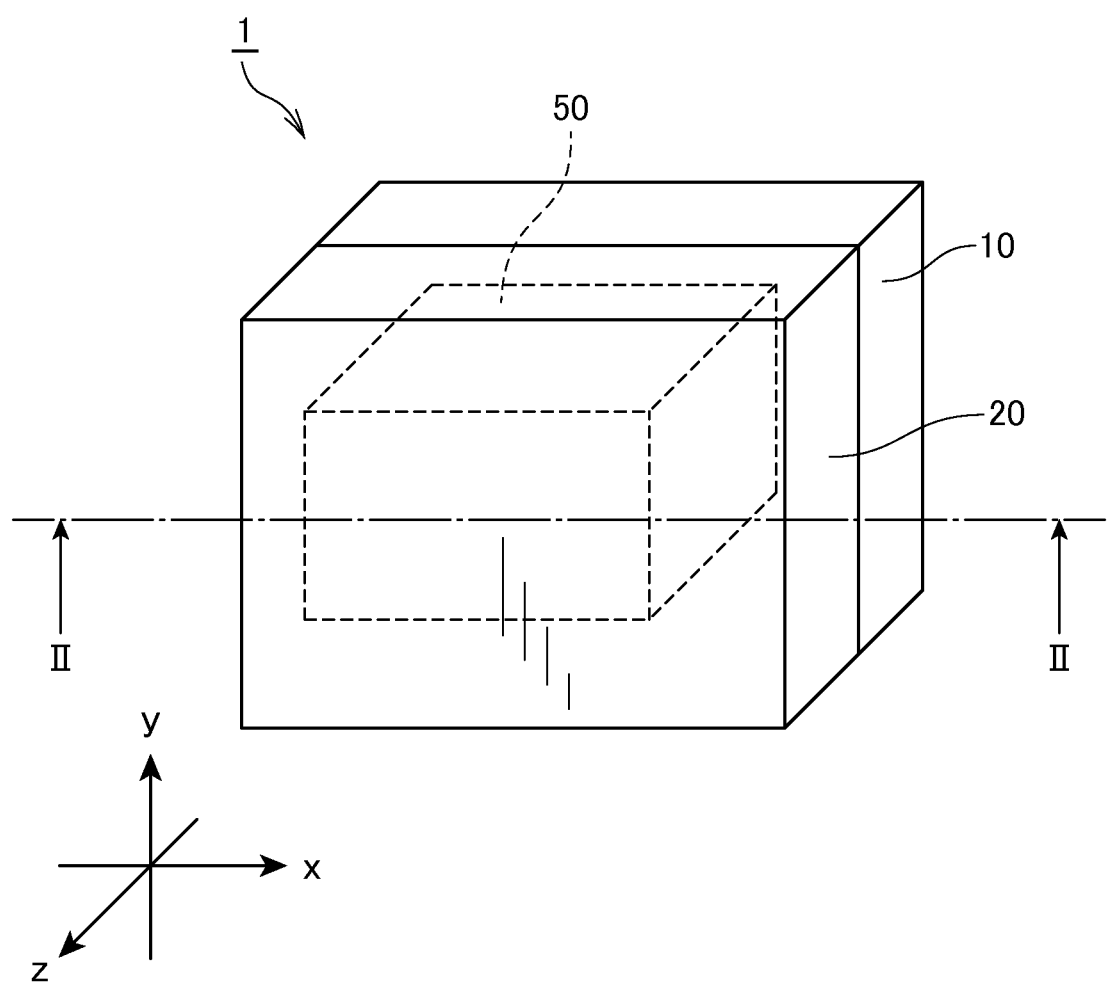
FIG. 1 is a perspective view illustrating a radar apparatus of a first embodiment.
Figure 2:
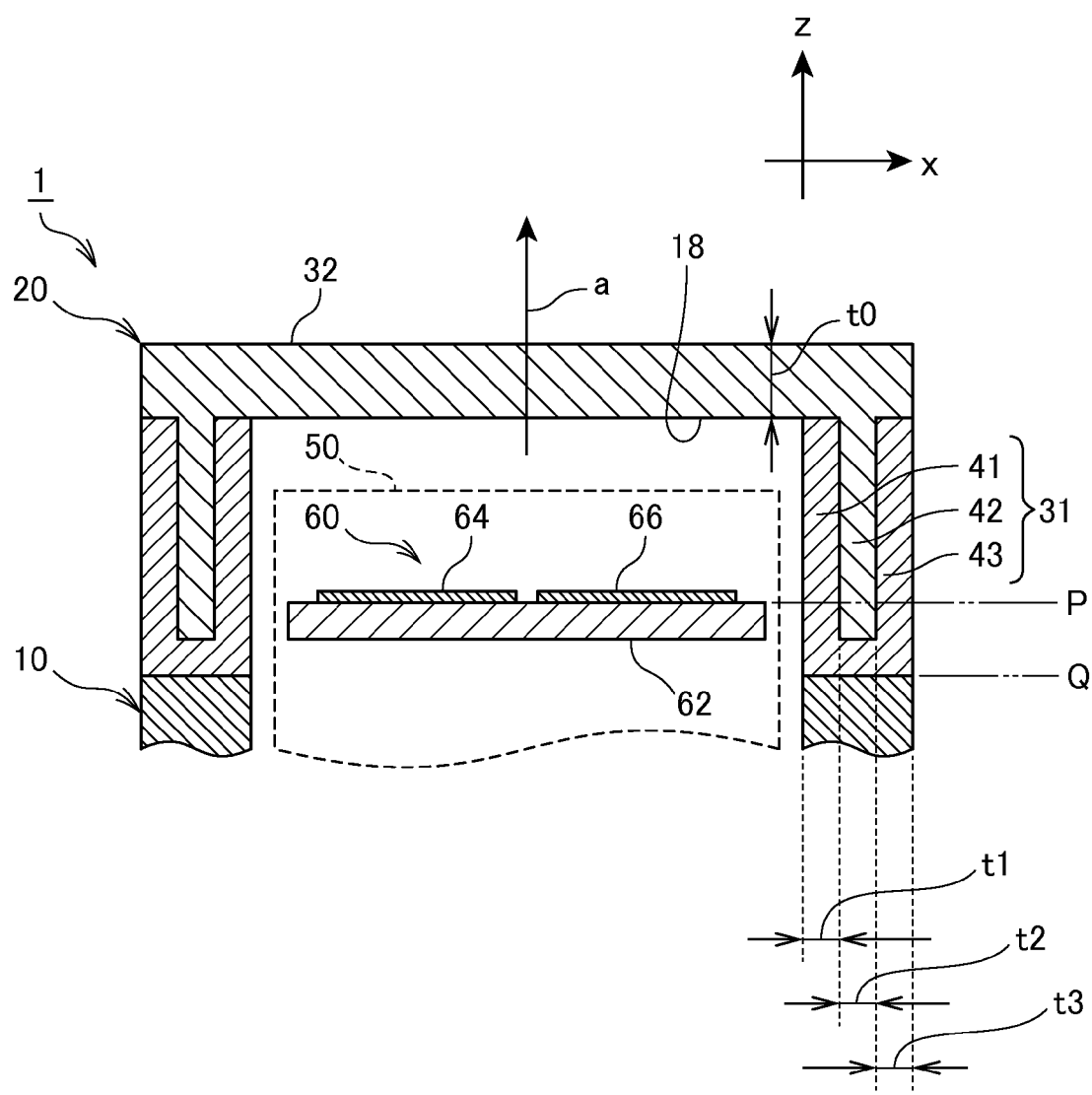
FIG. 2 is an explanatory view illustrating a configuration taken along a line II-II of FIG. 1, and as viewed from a direction indicated by the arrows.

As shown in FIG. 1, a radar apparatus 1 of a first embodiment includes a housing 10 and a radome 20 to be paired with the housing 10, and is substantially formed into a rectangular parallelopiped. As shown in FIG. 2, the radome 20 is formed into a bottomed cartridge shape, and composed of a transmission section 32 formed at a bottom portion and an attenuation section 31 formed enclosing the transmission section 32.

The housing 10 and the radome 20 define a housing space 18 that houses a radar unit 50 therein. The radar units 50 transmits a radio wave of a predetermined frequency f0 (hereinafter referred to as radar waves) and receives reflected waves of the radar wave reflected from a target to thereby recognize the target which is present around the vehicle. Detailed description of the radar unit 50 is omitted herein, but the radar unit 50 at least has an antenna section 60.

The antenna section 60 is composed of an antenna substrate 62. The antenna substrate 62 is arranged such that a surface thereof faces a surface of the transmission section 32 that is the surface forming the housing space 18 (hereinafter referred to as upper bottom surface). The surface of the antenna substrate 62 facing the upper bottom surface is provided with a transmitting antenna 64 and a receiving antenna 66, each being formed as an array antenna. Hereinafter, a surface on which both of the antennas are formed is referred to as an antenna-formed surface, and an area in which both of the antennas are formed is referred to as an antenna-aperture plane.

The antenna section 60 has a function that corresponds to a combination of the directivities of the transmitting and receiving antennas 64 and 66 (composite directivity). The composite directivity extends in a normal direction relative to the antenna-aperture plane (the direction of the arrow "a" in FIG. 2), and has a shape that is symmetric about the normal direction. Hereinafter, the normal direction "a" is referred to as beam direction "a" of the antenna section 60.

Specifically, of the radome 20, the transmission section 32 is located in the normal direction "a", i.e. the beam direction "a", while the attenuation section 31 is located in a direction out of the range of the composite directivity. It should be noted that the beam direction "a" corresponds to the direction of the z-coordinate shown in FIG. 1.

Referring to FIG. 2 again, the transmission section 32 is formed of a translucent material that allows transmission of the radar waves with a low loss. The transmission section 32 has a thickness $t_0$ which, as shown in Formula (1), is set to one-half the wavelength of a radar wave that propagates through the translucent material.

Math. 1

$$t_0 = \frac{1}{2}\left(\frac{\lambda_0}{\sqrt{\varepsilon_1}}\right) \quad (1)$$

In Formula (1), $\lambda_0$ represents a wavelength of a radar wave that propagates through a free space, and $\in_1$ represents a dielectric constant of the translucent material.

On the other hand, the attenuation section 31 has a transmission layer 42 formed of a translucent material which is the same as that of the transmission section 32, an attenuation layer 41 formed of an attenuating material and located on a housing space 18 side of the transmission layer 42, and an attenuation layer 43 formed of an attenuating material which is the same as that of the attenuation layer 41 and located on an outer side of the transmission layer 42. In other words, the attenuation section 31 has a three-layer structure in which the transmission layer 42 is sandwiched between the attenuation layers 41 and 43.

The attenuating material has a dielectric constant which is different from that of the translucent material, and allows transmission of the radar waves with a high loss. When the dielectric loss tangent (tan δ) of the translucent material is A1 and that of the attenuating material is A2, A1<<A2 is established.

The attenuation layers 41 and 43 have thicknesses $t_1$ and $t_3$, respectively. As shown in Formula (2), the thicknesses $t_1$ and $t_3$ in particular are each set to a value that corresponds to 2n−1 times (n is a natural number) of one-quarter of the wavelength of a radar wave that propagates through the attenuating material. The transmission layer 42 has a thickness $t_2$. As shown in Formula (3), the thickness $t_2$ is set to a value that corresponds to 2n−1 times (n is a natural number) of one-quarter of the wavelength of a radar wave that propagates through the translucent material.

Math. 2

$$t_1, t_3 = \frac{1}{4}\left(\frac{\lambda_0}{\sqrt{\varepsilon_1}}\right) \times (2n-1) \quad (2)$$

Math. 3

$$t_2 = \frac{1}{4}\left(\frac{\lambda_0}{\sqrt{\varepsilon_2}}\right) \times (2n-1) \quad (3)$$

In formula (3), $\in_2$ represents a dielectric constant of the attenuating material, and n is a natural number.

However, the thicknesses of the attenuation layers 41 and 43 and the transmission layer 42 herein are set on the basis of n=1. Specifically, $t_1$ and $t_3$ are each set to a value that is one-quarter of the wavelength of a radar wave propagating through the attenuating material, while $t_2$ is set to a value that is one-quarter of the wavelength of a radar wave propagating through the translucent material.

The radome 20 is formed, for example, using a two-color molding method. Specifically, the attenuating material is filled in a mold, first, to conduct primary molding in which a grooved body having a U-shaped cross section, with opposed walls each being imparted with a thickness of $t_1$ (=$t_3$), is formed into a substantially rectangular shape. Thus, the portions that have been molded to form opposed walls, each of which has a thickness $t_1$, turn to the attenuation layers 41 and 43. Subsequently, the primary molded product is placed in another mold, and the attenuating material is filled in between the attenuation layers 41 and 43 to form the attenuation section 31, followed by further filling in the attenuating material so as to fit to the mold to thereby form the transmission section 32. In this way, the radome 20 is molded as a secondary molded product in which the transmission layer 42 is integrated into the attenuation layers 41 and 43.

The antenna substrate 62 is arranged in the housing space 18 such that the beam direction "a" coincides with the vertical direction, with the upper surface (the antenna-formed surface (position P)) being located at an upper position relative to a lower end (position Q) of the attenuation layer 41 of the attenuation section 31.

Advantageous Effects

Figure 3:
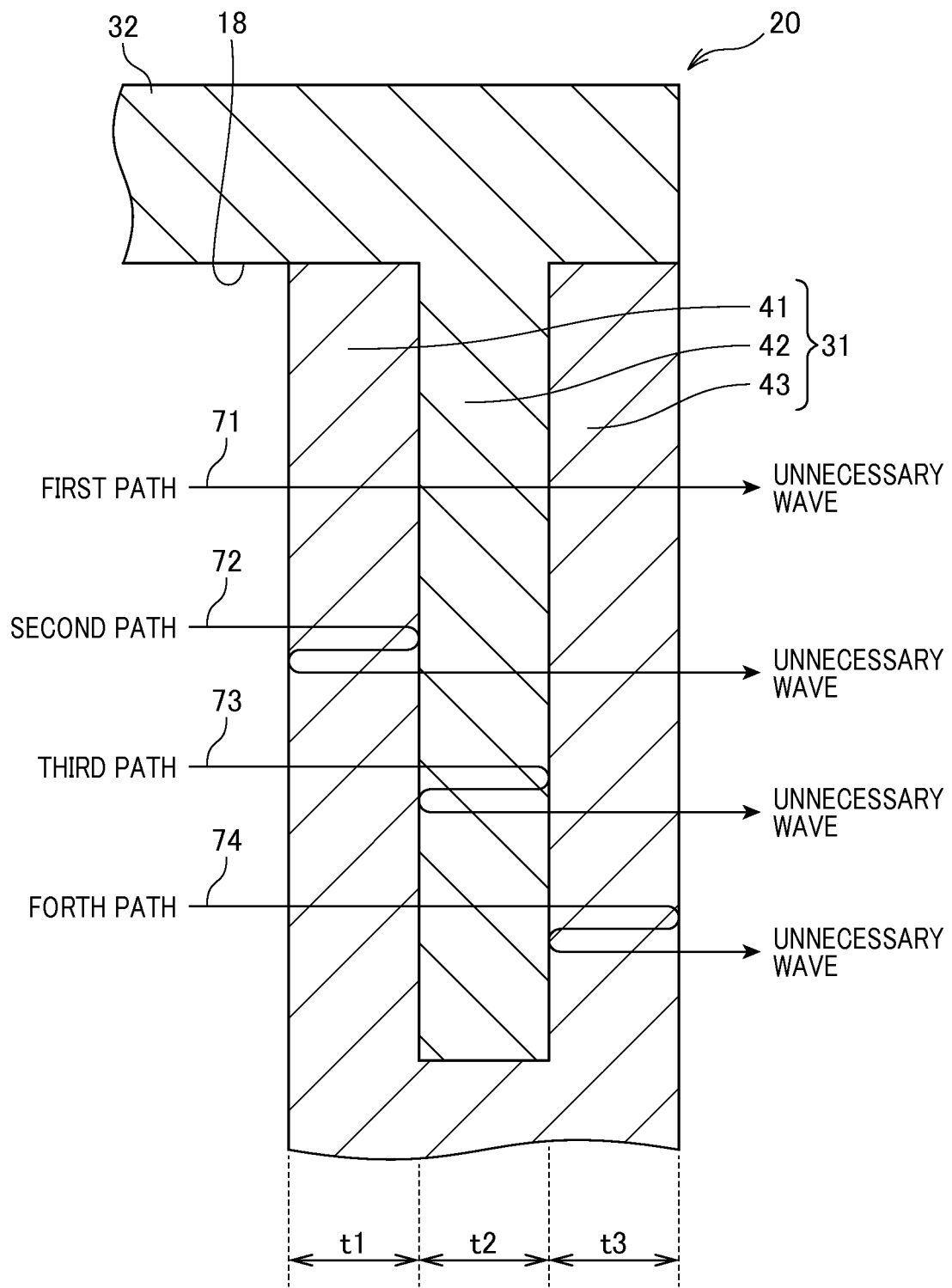
FIG. 3 is an explanatory view illustrating paths of unnecessary waves.

Advantageous effects of the radar apparatus 1 are described below by way of an example in which, as shown in FIG. 3, radar waves are transmitted outside the radar apparatus 1 via the antenna section 60 and the radome 20.

In the radar apparatus 1, a radar wave to be transmitted outside is attenuated when transmitting through the attenuation layers 41 and 43. Further, the radar wave is attenuated when transmitting through the transmission layer 42, although the ratio of attenuation is quite small compared to the transmission through the attenuation layers 41 and 43.

Further, in the radar apparatus 1, the path through which a radar wave is transmitted outside depends on the reflections in the attenuation layers 41 and 43 and the transmission layer 42. Accordingly, the radar waves transmitted outside have different phases. There can be several paths through which the radar waves are transmitted outside. For example, there can be a first path 71 in which a radar wave is transmitted in the order of the attenuation layer 41, the transmission layer 42 and the attenuation layer 43 without being reflected in any of the layers. There can be a second path 72 in which a radar wave is reflected at a boundary between the attenuation layer 41 and the transmission layer 42, then reflected at a boundary between the attenuation layer 41 and an air layer of the housing space 18, and then transmitted in the order of the attenuation layer 41, the transmission layer 42 and the attenuation layer 43, i.e. the radar wave is reflected at the boundaries on both sides of the attenuation layer 41.

Further, there can be a third path 73 in which a radar wave is reflected at a boundary between the transmission layer 42 and the attenuation layer 43, then further reflected at a boundary between the transmission layer 42 and the attenuation layer 41, and then transmitted through the transmission layer 42 and the attenuation layer 43, i.e. the radar wave is reflected at the boundaries on both sides of the transmission layer 42. Further, there can be a fourth path 74 in which a radar wave is transmitted through the attenuation layer 41 and the transmission layer 42, then reflected at a boundary between the attenuation layer 43 and the outside, then reflected at a boundary between the attenuation layer 43 and the transmission layer 42, and then transmitted through the attenuation layer 43, i.e. the radar wave is reflected at the boundaries on both sides of the attenuation layer 43.

A radar wave transmitted outside via the first path 71 (hereinafter referred to as simple transmission wave) is different from a radar wave transmitted outside via the second, third or fourth paths 72, 73 or 74 (hereinafter referred to as multiple-reflection wave). The difference corresponds to one-half the wavelength of the radar wave in each of the attenuation layer 41, the transmission layer 42 and the attenuation layer 43, causing a deviation in phase by one-half of the wavelength. Therefore, the simple transmission wave and the multiple-reflection wave act so as to cancel each other.

Description herein is given by way of an example of the first to fourth paths 71 to 74. However, there are other various paths in which the radar waves cancel each other, including the case where the difference between paths has a value equivalent to one-half of a wavelength, or the case where the difference has a value equivalent to a value obtained by adding an integral multiple of a wavelength to one-half of the wavelength.

In other words, the radar apparatus 1 allows the attenuation layers 41 and 43 and the transmission layer 42 to attenuate the radar waves transmitted via the attenuation section 31, and at the same time, allows cancellation of the radar waves making use of the difference between paths.

Advantageous Effects

As described above, the radar apparatus 1 of the present embodiment has a configuration in which the attenuation section 31 provided in a direction outside the range of the composite directivity of the antenna section 60 not only attenuates the radar waves relying on the quality of the material, but also allows the simple transmission wave and the multiple-reflection wave to cancel each other. Accordingly, radar waves can be efficiently shielded. Thus, a transmission wave or a reception wave in a direction out of the range of the composite directivity of the antenna is attenuated as an unnecessary wave, thereby improving the characteristics of the radar apparatus.

Further, since the attenuation section 31 has a three-layer structure, the strength of the radome 20 can be enhanced, compared to the case where the attenuation section has a single-layer structure composed of a single attenuation layer.

Furthermore, since the transmission layer 42 is formed of the same material as the one forming the transmission section 32, the radome 20 can be easily formed by using two-color molding. In addition, the attenuation layers 41 and 43, i.e. the attenuation section 31, can be formed with a small thickness, owing to the effect of shortening wavelength in the dielectric material. As a result, the size of the radar apparatus 1 can be reduced.

Correspondency with the Claims

The antenna section 60 of the present embodiment corresponds to the "antenna" in the claims; the attenuation section 31 corresponds to the "attenuation section" in the claims; the attenuation layer 41 or 43 corresponds to the "first attenuation layer"; and the transmission layer 42 corresponds to the "second attenuation layer" in the claims. Further, the area in which the transmitting antenna 64 and the receiving antenna 66 are formed corresponds to the "aperture plane" in the claims.

Second Embodiment

Figure 4:
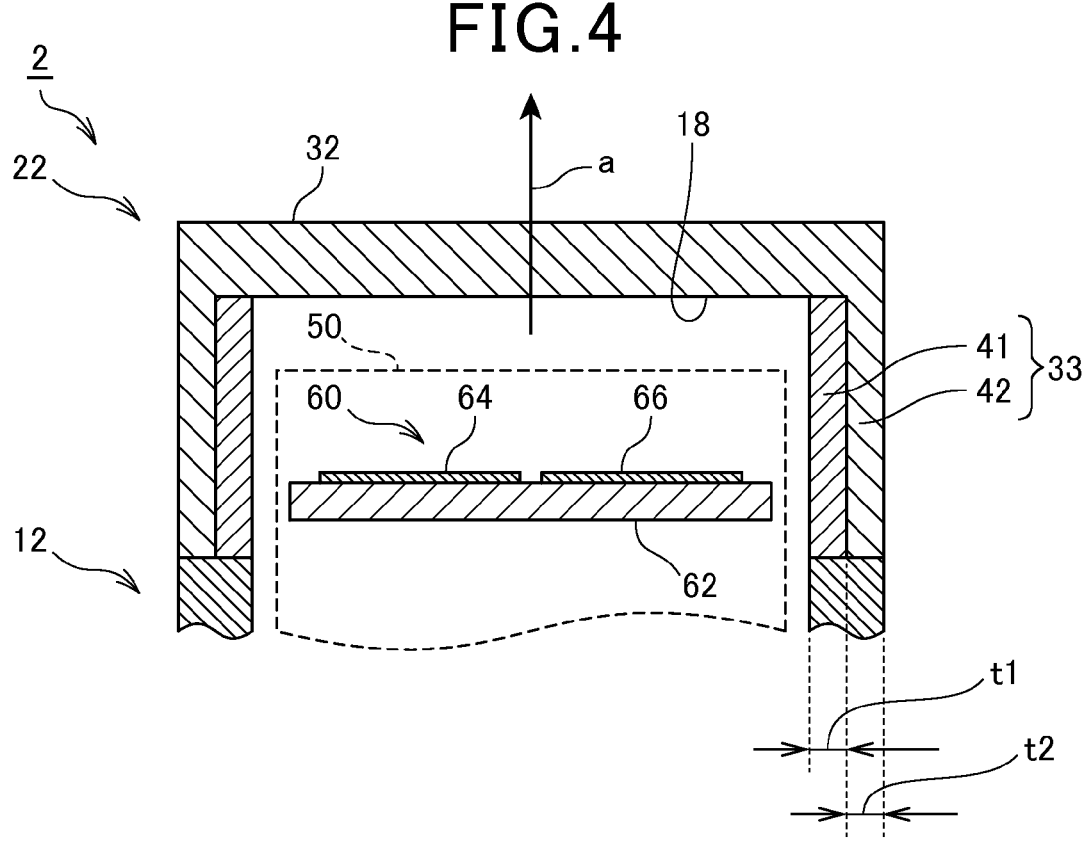
FIG. 4 is an explanatory view illustrating a radar apparatus of a second embodiment.

As shown in FIG. 4, a radar apparatus 2 of a second embodiment is different from the above embodiment in that an attenuation section 33 of a radome 22 has a two-layer structure. In the embodiment described below, description is mainly focused on the configuration different from the above embodiment. In the figure, those components which are similar to those of the above embodiment are designated with the same reference numbers to omit description in detail.

The radome 22 has a configuration similar to that of the above embodiment, except that the attenuation layer 43 is removed from the attenuation section 31 of the radome 20. Thus, the radome 22 is composed of the attenuation layer 41 and the transmission layer 42. Accordingly, the attenuation section 33 is thinner than the attenuation section 31 of the above embodiment, and a housing 12 is formed with a thickness conforming to that of the attenuation section 33.

The radar apparatus 2 configured in this way has a simple structure and thus can be easily manufactured.

Third Embodiment

Figure 5:
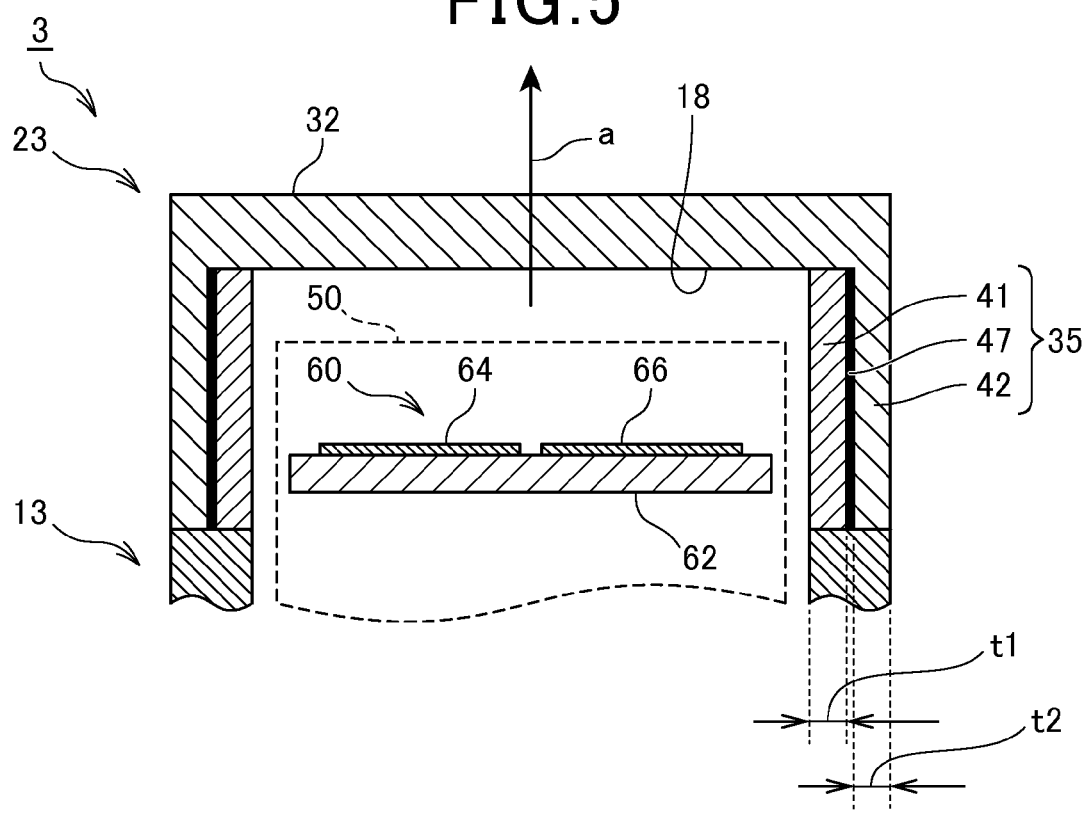
FIG. 5 is an explanatory view illustrating a radar apparatus of a third embodiment.

As shown in FIG. 5, a radar apparatus 3 of a third embodiment is different in that a radome 23 has an attenuation section 35 which is provided with an electrically conductive layer 47. The electrically conductive layer 47 is formed of a metal film and arranged between the attenuation layer 41 and the transmission layer 42.

With this configuration, unnecessary waves are suppressed from being transmitted and received through an attenuation section 35 because the electrically conductive layer 47 does not allow transmission of the radio waves.

Further, in transmission, mutual cancellation action occurs between a reflected wave that is reflected at the boundary between the attenuation layer 41 and the housing space 18, and a reflected wave that is reflected at the boundary between the attenuation layer 41 and the electrically conductive layer 47. Accordingly, unnecessary waves inside the radar apparatus 3 (housing space 18) can be reduced.

It should be noted that the electrically conductive layer 47 of the present embodiment corresponds to the "third attenuation layer" in the claims.

Fourth Embodiment

Figure 6:
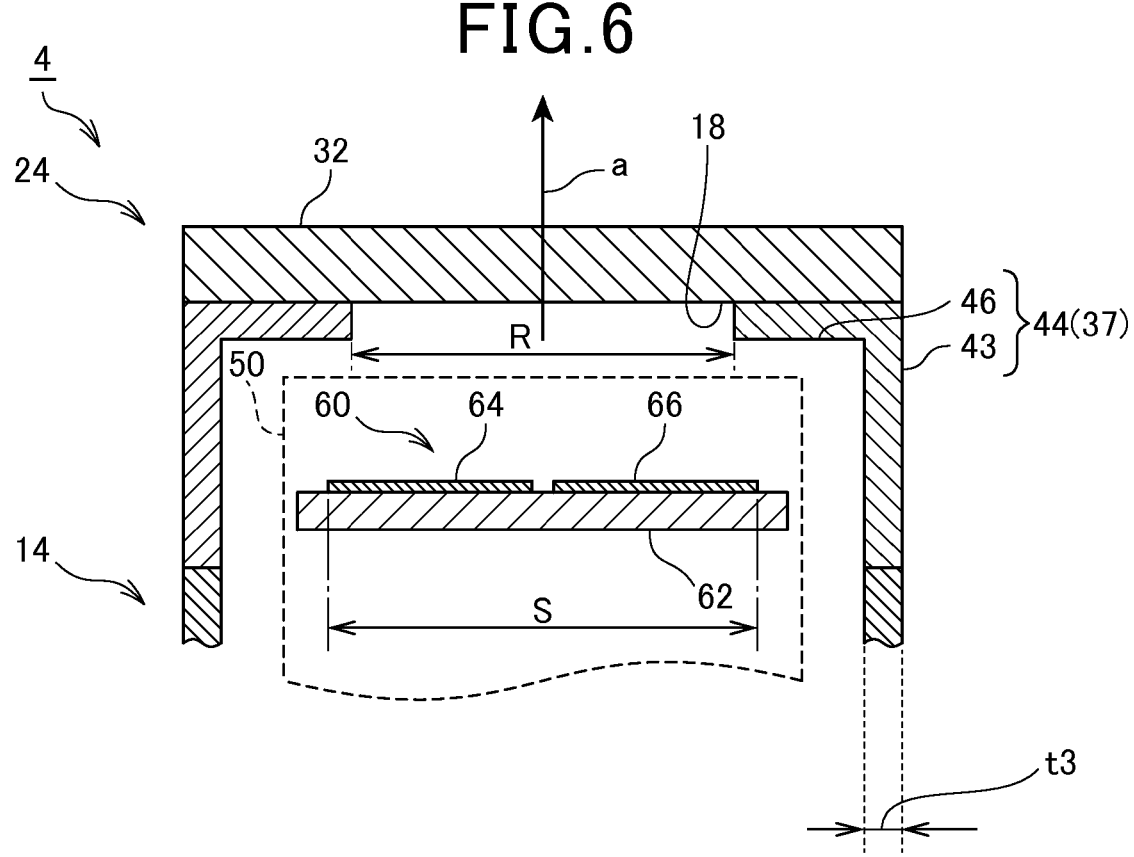
FIG. 6 is an explanatory view illustrating a radar apparatus of a fourth embodiment.

As shown in FIG. 6, a radar apparatus 4 of a fourth embodiment is different from the foregoing embodiments in the configuration of an attenuation section 37. The attenuation section 37 has a single-layer structure composed of the attenuation layer 43, and a housing 14 is formed with a thickness conforming to that of the attenuation layer 43.

The attenuation layer 43 includes a wall portion 45 which corresponds to a side wall of a radome 24 that is formed into a bottomed cartridge shape, and an upper face portion 46 which is formed being extended from the wall portion 45, along the transmission section 32, to the center of the radome 24. Specifically, in the present embodiment, the attenuation section 37 is formed along the perimeter of the transmission section 32. The transmission section 32 corresponds to a portion of the radome 24, on which an antenna-aperture plane can be projected in the normal direction (beam direction) "a".

Of the transmission section 32, a portion that is not overlapped with the attenuation section 37 is located nearer the center relative to the portion on which the antenna-aperture plane can be projected in the normal direction. Further, the portion of the transmission section 32, which is not overlapped with the attenuation section 37, has an area R which is ensured to be smaller than an antenna-aperture area S (R<S).

The radar apparatus 4 configured in this way is able to further improve the effect of shielding unnecessary waves in an area which is out of the range of the composite directivity of the antenna section 60.

Other Embodiments

Some embodiments of the present disclosure have so far been described. However, the present disclosure should not be construed as being limited to the foregoing embodiments but may be implemented in various modes within a scope not departing from the spirit of the present disclosure.

(A) In the foregoing embodiments, the attenuation section of the radome has a single-layer structure including a first attenuation layer, a two-layer structure including the first attenuation layer and a second attenuation layer, and a three-layer structure including two or more first attenuation layers and a single transmission layer. However, this should not impose a limitation. The radome may have a three-layer structure including a single first attenuation layer and two or more second attenuation layers and dielectric layers, or may include a stack of two or more layers in which the first and second attenuation layers are alternately stacked.

(B) The electrically conductive layer is configured by a metal film in the forgoing embodiment. However, this should not impose a limitation.

(C) The beam direction "a" of the antenna section 60 in the foregoing embodiments is the normal direction relative to the antenna-formed surface of the antenna substrate 62. However, the beam direction of the antenna section should not be construed as being limited to this but may be optionally determined. Further, the range of the composite directivity of the antenna section 60 in the foregoing embodiments is symmetric about the beam direction "a". However, the range should not be construed as being limited to this but may be optionally determined. The radome may only have to be configured such that a portion through which a radar wave is desired to be transmitted (portion located within the range of the composite directivity) is configured as a transmission section, and a portion through which a radar wave is desired not to be transmitted (portion located in a direction out of the range of the composite directivity) is configured as an attenuation section.

(D) In the foregoing embodiments, the thicknesses of the attenuation layers 41 and 43 and the transmission layer 42 are set to the values, being based on n=1 in Formulas (2) and (3). However, this should not impose a limitation. The thicknesses of the attenuation layer and the transmission layer may each be set to a value (natural number) with n being optionally determined. Further, as far as at least one of the attenuation layers is ensured to have a value that meets Formula (2), other layers configuring the attenuation section may each have an optionally set thickness.

(E) In the foregoing embodiments, the radome is formed using a two-color molding method. However, this should not impose a limitation. For example, the attenuation layer and the transmission layer may be separately formed using injection molding or the like, followed by adhering these layers using an adhesive for the formation of the radome. Alternatively, the attenuation layer and the transmission layer may be separately formed, followed by thermocompression bonding for integration. Alternatively, the attenuation layer and the transmission layer may be separately formed, followed by providing a groove or the like and fitting the layers for integration.

(F) The radar apparatus is used being installed in a vehicle and may be mounted to any portion of the vehicle. In this case, the radar apparatus may be configured such that a part of the vehicle body located in the beam direction is formed of a translucent material and a part of the vehicle body located in a direction out of the beam direction is formed of an attenuating material, so that these parts can serve as the radome of the foregoing embodiments.

For example, the radar apparatus may be mounted to the reverse (vehicle side) of an emblem which is provided to the bumper of a vehicle, the radar apparatus having a size smaller than that of the emblem. In such a case, the emblem that is located in the beam direction may be formed of a translucent material, and the wall portion extending from the back of the emblem toward the vehicle, along the outer edge of the emblem may be formed of an attenuating material. The thickness of the wall portion in this case is set to a value that is 2n−1 times (n is a natural number) of one-quarter of the wavelength of the radar wave in the attenuating material. In other words, the emblem which is formed of the translucent material and the attenuating material may be configured to serve as the radome of the radar apparatus.

Further, for example, the radar apparatus may be mounted inside a rearview mirror (reverse of the mirror) which is provided in the vehicle cabin. In such a case, a portion of the back (the casing to which the mirror is mounted) of the rearview mirror, which is located in the beam direction may be formed of a translucent material and a portion located in a direction out of the beam direction may be formed of an attenuating material. The thickness of the portion located in a direction out of the beam direction in this case is set to a value that is 2n−1 times (n is a natural number) of one-quarter of the wavelength of the radar wave in the attenuating material. In other words, the back of the rearview mirror which is formed of the translucent material and the attenuating material may be configured to serve as the radome of the radar apparatus.

The location and the size of the radar apparatus should not be construed as being limited to the ones described above. Further, various modes may be applied to a part of a vehicle body that can serve as a part of the radome of the radar apparatus.

REFERENCE SIGNS LIST 1, 2, 3, 4 Radar apparatus
20, 22, 23, 24 Radome
31 Attenuation section
32 Transmission section
33, 35, 37 Attenuation section
41 Attenuation layer
42 Transmission
43 Attenuation layer
47 Electrically conductive layer

What is claimed is:

1. A radar apparatus comprising:
    an antenna that performs at least one of transmission and reception of radar waves composed of radio waves of a predetermined frequency; and
    a radome having a transmission section that is a portion transmitting the radar waves therethrough and an attenuation section that is a portion attenuating the radar waves, wherein
    the attenuation section at least includes a first attenuation layer formed of a material that attenuates the radar waves, a second attenuation layer stacked onto the first attenuation layer and formed of a material having a dielectric constant that is different from that of the first attenuation layer and a third attenuation layer formed to sandwich the second attenuation layer between the first attenuation layer and the third attenuation layer;
    the first attenuation layer has a thickness that is 2n−1 times (n is a natural number) of one-quarter of a wavelength of the radar waves in the first attenuation layer;
    the second attenuation layer is formed of the same material as that forming the transmission section; and
    the third attenuation layer is formed of the same material as the material forming the first attenuation layer.

2. The radar apparatus according to claim 1, wherein the second attenuation layer has a thickness that is 2n−1 times (n is a natural number) of one-quarter of a wavelength of the radar waves in the second attenuation layer.

3. The radar apparatus according to claim 1, wherein the radome has the transmission section that is a portion on which an aperture plane of the antenna is projected in a normal direction relative to the antenna-aperture plane, with the attenuation section being formed around the transmission section.

4. The radar apparatus according to claim 1, wherein the radar apparatus is installed in a vehicle.

* * * * *